United States Patent
Gallo

[11] Patent Number: 6,007,642
[45] Date of Patent: Dec. 28, 1999

[54] SUPER LOW LOSS MOTOR LAMINATION STEEL

[75] Inventor: Eric E. Gallo, Southgate, Mich.

[73] Assignee: National Steel Corporation, Mishawaka, Ind.

[21] Appl. No.: 08/986,933

[22] Filed: Dec. 8, 1997

[51] Int. Cl.⁶ ...................................................... H01F 1/147
[52] U.S. Cl. .......................................... 148/111; 148/112
[58] Field of Search ..................................... 148/111, 112, 148/113, 110

[56] References Cited

U.S. PATENT DOCUMENTS

| | | |
|---|---|---|
| 3,347,715 | 10/1967 | Pfeil . |
| 3,892,605 | 7/1975 | Thornburg . |
| 3,990,887 | 11/1976 | Hisada . |
| 4,204,890 | 5/1980 | Irie et al. . |
| 4,296,919 | 10/1981 | Sakurai et al. . |
| 4,390,378 | 6/1983 | Rastogi . |
| 4,421,574 | 12/1983 | Lyudkovsky ............................ 148/111 |
| 4,534,805 | 8/1985 | Jesseman . |
| 4,662,950 | 5/1987 | Abrams et al. . |
| 4,772,341 | 9/1988 | Rastogi et al. . |
| 4,946,519 | 8/1990 | Honda et al. . |
| 5,049,204 | 9/1991 | Iwanaga et al. . |
| 5,074,930 | 12/1991 | Nishimoto et al. . |
| 5,082,510 | 1/1992 | Nishimoto et al. . |
| 5,169,457 | 12/1992 | Nishimoto et al. . |
| 5,186,763 | 2/1993 | Kubota et al. . |
| 5,258,080 | 11/1993 | Burger et al. . |
| 5,482,107 | 1/1996 | Judd . |
| 5,609,696 | 3/1997 | Lauer et al. . |
| 5,798,001 | 8/1998 | Anderson ................................. 148/120 |
| 5,803,989 | 9/1998 | Kawamata et al. ..................... 148/120 |

OTHER PUBLICATIONS

LTV Steel Company, "Closing the Gap With Electrical Lamination Steels: A Producer's Point of View", Robert P. Dunkle and Robert H. Goodenow pp. 41–54, 1986.

*Primary Examiner*—John Sheehan
*Attorney, Agent, or Firm*—Kerkam, Stowell Kondracki & Clarke, P.C.; James L. Bean; John C. Kerins

[57] ABSTRACT

The present invention is directed to a low loss motor lamination steel having a relatively low alloy content, which has a composition such that the motor lamination steel is fully ferritic at all solid temperatures. The steel preferably includes 1.20–1.40 wt. % silicon, 0.25–0.40 wt. % aluminum, 0.15–0.30 wt. % manganese and not more than 0.005 wt. % carbon. The processes for producing the fully ferritic low loss motor lamination steel include a hot band anneal followed by cold rolling, and a two-stage or double cold roll process.

10 Claims, No Drawings

SUPER LOW LOSS MOTOR LAMINATION STEEL

BACKGROUND OF THE INVENTION

1. Field of the Invention

The present invention is directed to low loss semi-processed, cold rolled, motor lamination steels and processes for producing such steels.

2. Description of Related Art

Numerous prior patents have issued in the field of electrical and motor lamination steels, disclosing steels and production processes therefor which were developed with the goal of obtaining low core losses and high magnetic permeability. Silicon steels, generally having a silicon content in the range of 3 wt. % and higher, have been used as electrical steels. Such steels are expensive to produce, and require great care and control over the processing conditions. Steels having significantly lower silicon contents have also been proposed, but there continues to be a great need for economical motor lamination steels having significantly improved magnetic properties.

A recently issued patent to Lauer et al., U.S. Pat. No. 5,609,696, is directed to an electrical steel that is disclosed as possessing good magnetic and mechanical properties. This steel is an example of a steel having a very low carbon content, as well as a relatively low silicon content, proposed for use as an electrical steel. The disclosure in the Lauer et al. patent evidences that the processing of the steel will result in the steel having either an austenitic microstructure or a dual-phase austenitic/ferritic microstructure during hot rolling. The Lauer et al. patent attributes the improved magnetic properties to the use of a very light temper reduction of 1.0% (or less) thickness reduction, as compared with more traditional temper rolling with thickness reductions on the order of 3–8%.

For certain applications, low loss motor lamination steels are required to have a maximum 1.74 W/# (watts/pound) core loss, and a minimum of 2000 G/Oe (Gauss/Oersted) magnetic permeability. In such applications, the steel sheet used will have a nominal thickness of 0.0185", alternatively referred to as 26 gauge steel sheet. Lauer et al. discloses that the steels obtained therein have good magnetic properties, however the steels disclosed in Lauer et al. have core losses that far exceed the core loss maximum (1.74 W/#) in the above-noted requirement.

Numerous other patents and publications exist which are directed to low loss electrical or motor lamination steels. None, however, teach or suggest the product and process of the present invention, in which the motor lamination steel meets the above-mentioned magnetic property requirements.

It is a principal object of the present invention to provide a low loss motor lamination steel having improved magnetic properties, wherein the steel is fully ferritic upon solidification and remains ferritic throughout the processing into a final product.

It is an additional principal object of the present invention to provide a low loss motor lamination steel that minimizes the use of alloy additions to thereby further improve the magnetic properties of the steel.

It is a further principal object of the present invention to provide processes for producing a low loss motor lamination steel having magnetic properties which have a maximum 1.74 W/# core loss and a minimum 2000 G/Oe permeability.

It is a further important object of the present invention to provide a steel and processes for making the steel in which the final grain size is maximized, and in which the {hkl} textures are minimized, with the {hk0} and {h00} textures maximized.

SUMMARY OF THE INVENTION

The above and other important objects of the present invention are achieved by a steel alloy having a composition in which the carbon, silicon, aluminum and manganese contents are as follows:

| Element | Wt. Percent |
| --- | --- |
| C | ≦0.005 |
| Si | 1.0–1.8 |
| Al | 0.20–0.70 |
| Mn | 0.15–0.60 |

In a more preferred composition, these elements are present in the following amounts:

| Element | Wt. Percent |
| --- | --- |
| C | ≦0.005 |
| Si | 1.20–1.40 |
| Al | 0.25–0.40 |
| Mn | 0.15–0.30 |

In addition, the steel may have sulfur, in an amount not to exceed 0.015 weight percent; antimony in the range of 0.04–0.08 weight percent; niobium, up to 0.005 weight percent; vanadium, up to 0.004 weight percent, and the balance iron and unavoidable impurities.

The composition of the steel of the invention is such that the steel will remain fully ferritic throughout the processing of the steel, which will impart improved magnetic properties in the finished product as compared with traditional motor lamination steels, which are of compositions and which are processed in a manner that includes a transformation from austenite. The process for producing motor lamination steels of the foregoing composition includes obtaining a cast slab, and conducting a hot roll step, a hot band annealing, cold rolling, a batch anneal, then a temper roll, and a final anneal. Alternatively, the slab can be subjected to a two stage cold rolling including an initial hot rolling, a cold roll followed by a batch anneal, a second cold roll, a second batch anneal, a temper roll and a final anneal. Temperatures selected for the various steps are selected to enhance, to the extent possible, the magnetic properties of the steel.

DETAILED DESCRIPTION OF THE PREFERRED EMBODIMENT

Low loss motor lamination steels of the present invention which have the desired good magnetic properties (1.74 W/# maximum core loss, 2000 G/Oe permeability) preferably have a composition in which carbon is present in an amount less than or equal to 0.005 weight percent, silicon is present in a range of about 1.0–1.8 weight percent, aluminum is present in a range of about 0.20–0.70 weight percent, and manganese is present in a range of about 0.15–0.60 weight percent. A more preferred composition has carbon in an amount less than or equal to about 0.005 weight percent, silicon in a range of about 1.20–1.40 weight percent; aluminum in a range of about 0.25–0.40 weight percent, and manganese in a range of about 0.15–0.30 weight percent. An especially preferred steel in accordance with the present invention has alloying elements in the following compositional ranges:

| Element | Wt. Percent |
|---|---|
| C | ≦0.005 |
| Si | 1.20–1.40 |
| Al | 0.25–0.40 |
| Mn | 0.15–0.30 |
| S | ≦0.015 |
| Sb | 0.04–0.08 |
| Fe | Balance |

The preferred steel may have residual amounts of elements such as Ti, Nb and/or V, in amounts not to exceed 0.005 wt. % for Ti and Nb, and not to exceed 0.004 wt. % for V.

Steels having compositions falling within these ranges will have a fully ferritic microstructure upon solidifcation and through the hot rolling process, and thereafter in the finished product. Preferably the finished product will be a product known as a semi-processed motor lamination steel.

Ferritic steels in general require greater care in handling through the hot rolling and annealing processes as compared with austenitic steels hot rolled in an austenitic phase or in a dual phase of austenite and ferrite. Ferritic steels have lower hot strength, which leads to a tendency for the material to droop during reheating of the slabs for processing. Special care must be exercised to prevent or minimize this drooping. Also, while slabs of ferritic steel are soft at high temperatures, they are brittle at room temperatures, and the slabs must thus be hot-charged into the reheat furnace to avoid cold cracking during the cooling and reheating of the slabs.

Notwithstanding these known disadvantages of processing fully ferritic steels in general, it has been determined in the development of the steel of this invention that the fully ferritic microstructure is advantageous in obtaining the desired magnetic properties while maintaining a reasonably low alloy content. One such benefit is that fully ferritic steels have lower precipitate (carbide, nitride) solubility as compared with austenitic steels. Thus, during reheating of the fully ferritic material, the degree of dissolution of the precipitates is lower, which has the effect of maintaining the precipitates as coarse as possible. Maintaining coarse precipitates in the hot band in turn decreases the potential for grain pinning and improves the core loss and permeability of the steel.

It is to be noted that, as used herein, the term "fully ferritic steel" is used to define steels that do not undergo any transformation to austenite, and the term "austenitic steel" is used to define a steel that has undergone a change to austenite in the course of cooling from the melt and/or in reheating for hot rolling, regardless of its final room temperature microstructure.

The fully ferritic steels of the present invention also develop coarser or larger grain sizes after hot rolling, because the steel will not undergo an austenite-to-ferrite phase transformation. A coarse grain size is preferred over fine grain sizes to promote the desirable {h00} and {hk0} texture of the steel after cold rolling and annealing. Some amount of the material near the surface will develop with a {110} texture, due to the shearing of ferrite grains undergoing roll reduction. These planar components are preferred over material having {111} texture in low loss steels, and also over the more random textures that develop in austenitic steels that are finished at or above the $A_1$ temperature, resulting from the austenite to ferrite phase transformation.

Two different sets of processing conditions can be employed with the steel of the present invention to achieve the desired magnetic properties for the fully ferritic steel. A first process includes hot-band annealing, and the second involves two cold reduction steps and two batch annealing steps.

More specifically, a first preferred process for producing a steel in accordance with the present invention includes the following steps:

(a) obtaining a slab of a steel having a composition falling within the ranges:

| | |
|---|---|
| C | ≦0.005 |
| Si | 1.20–1.40 |
| Al | 0.20–0.40 |
| Mn | 0.15–0.30 |
| S | ≦0.015 |
| Sb | 0.04–0.08 | balance Fe, residuals (e.g., Ti, Nb, V) and unavoidable impurities;

(b) hot rolling the slab to a thickness on the order of 0.115 in., preferably at an initial temperature in the range of about 2000–2300° F. (1079–1248° C.), a finishing temperature of about 1675° F. (899° C.) and a coiling temperature in the range of about 1300° F.–1450° F. (704–774° C.);

(c) conducting a hot-band anneal at a temperature preferably in the range of about 1450° F. (774° C.) to 1550° F. (829° C.), in an $H_2$ atmosphere;

(d) cold rolling the material to a thickness on the order of 0.0195 in.;

(e) batch annealing the material at a temperature in the range of about 1050° F.–1200° F. (551–635° C.);

(f) temper rolling the sheet to a thickness on the order of 0.0185 in.; and (g) conducting a final grain growth anneal, alternatively referred to as a decarburization anneal at a temperature of about 1480–1600° F. (790–857° C.) in a dry 85/15 $HN_x$ atmosphere, for about 40 minutes.

In this process, it is desirable to maintain the finishing and coiling temperature in the hot rolling step, and the temperature in the hot band annealing step, as high as practicable. A high finishing temperature has proven to maximize the grain size from hot rolling, and a high coiling temperature (and the resultant length of time involved in cooling) allows increased time for grain and precipitate growth.

The use of a high temperature for the hot band anneal permits additional grain growth when carried out at a temperature higher than the coiling temperature, and allows time for the segregation of elements to the grain boundaries. The increased grain size, the coarsening of the precipitates, and the segregation of elements to the grain boundaries, all have the effect of improving the texture of the steel in the post-cold rolled and annealed state.

It is preferred, in the above process, to use hydrogen ($H_2$) as the atmosphere for the hot band anneal, although, at lower hot band anneal temperatures, $HN_x$ may also be used.

It is to be noted that, when the steel is to be supplied in a semi-processed condition, the steel sheet manufacturer will conduct process steps (a)–(f) above, with the final decarburization anneal being performed by the customer, such as an electrical equipment manufacturer. At that point, the steel sheet supplied may not have the desired low core loss and high permeability, but will have been processed and conditioned such that the required magnetic properties will develop in the final decarburization anneal.

A second preferred process for producing a steel in accordance with the present invention includes the following steps:

(a) obtaining a slab of steel having a composition falling within the ranges:

| | |
|---|---|
| C | ≦0.005 |
| Si | 1.20–1.40 |
| Al | 0.20–0.40 |
| Mn | 0.15–0.30 |
| S | ≦0.015 |
| Sb | 0.04–0.08 | balance Fe, residuals (e.g., Ti, Ni, V) and unavoidable impurities, (b) hot rolling the slab to a thickness on the order of 0.155 in., preferably at an initial temperature of about 2000–2300° F. (1079–1248° C.), a finishing temperature of about 1715° F. (921° C.), and a coiling temperature of about 1300–1500° F. (690–801° C. or as high as about 1525° F. (815° C.); (1300–1500° F.)

(c) cold rolling the steel at about a 48% reduction, to about 0.080 in.;

(d) batch annealing the material at a temperature of about 1200° F.–1450° F. 635–774° C., and more preferably about 1300°–1450° F.; (1300–1450).

(e) performing a second cold rolling at about a 75% reduction, to about 0.0195 in.;

(f) performing a second batch anneal at a temperature in the range of about 1050° F.–1200° F. (551–635° C.);

(g) temper rolling the sheet to a thickness on the order of about 0.0185 in.; and (h) conducting a final grain growth anneal, alternatively referred to as a decarburizing anneal, at a temperature of about 1480–1600° F. (790–857° C.) in a dry 85/15 $HN_x$ atmosphere, for about 40 minutes.

An especially preferred temperature for performing the batch anneal of step (f) above is 1080° F. (568° C.).

This second preferred process may be referred to as a double cold reduction or double cold roll process. Commonly, high degrees of cold rolling reduction favor the creation of the {111} texture, which, as noted earlier, adversely impacts the magnetic properties of the steel. Thus, in this second preferred process, the cold reduction is effected in two stages, with an intermediate recrystallization anneal. This reduces the tendency to form {111} textures, in that the total reduction is accomplished by being split into two steps, and the material is annealed to allow recrystallization prior to the second cold roll step.

This double or two-stage cold roll process has the additional benefit of lowering loads in the cold mill. Also, the two stage process allows for thicker incoming hot bands to be reduced, which in turn allows the finishing and coiling temperatures to be increased. The use of higher finishing and coiling temperatures results in a softer hot band having increased grain size and having improved hot band textures.

Again, the semi-processed steel sheet that will generally be supplied by the steel producer will not have received the final anneal in step (h) above, but that final anneal will be conducted by the customer for the steel sheet.

It is to be understood that the foregoing description of the preferred embodiments of the present invention is provided for illustrative purposes, and variations may become apparent to those of ordinary skill in the art upon reading this disclosure. Such variations do not depart from the spirit and scope of the present invention, and the scope of the invention is to be determined by reference to the appended claims.

What is claimed is:

1. A process for producing a low loss motor lamination steel comprising the steps of:

(a) obtaining a slab of steel having a composition falling within the ranges:

| | |
|---|---|
| C | ≦0.005 |
| Si | 1.20–1.40 |
| Al | 0.20–0.40 |
| Mn | ≦0.015 |
| Sb | 0.04–0.08 | balance Fe, residuals, and unavoidable impurities;

(b) hot rolling the slab to a first reduced thickness;

(c) cold rolling the steel to a second reduced thickness;

(d) performing a first batch anneal;

(e) performing a second cold rolling to a third reduced thickness;

(f) then performing a second batch anneal; and (g) temper rolling the sheet to a fourth reduced thickness wherein no hot band anneal is performed after the hot rolling step (b) and before the cold rolling step (c).

2. A process as recited in claim 1, comprising the further step of:

(h) conducting a final grain growth anneal.

3. A process as recited in claim 1, wherein said step of hot rolling the slab is commenced at a temperature in a range of about 2000–2300° F., employs a finishing temperature of about 1715° F., and uses a coiling temperature of about 1300–1500° F.

4. A process as recited in claim 1, wherein said first batch anneal is conducted at a temperature of about 1300° F.–1450° F.

5. A process as recited in claim 1, wherein said second batch anneal is conducted at a temperature in the range of about 1050–1200° F.

6. A process as recited in claim 2, wherein said final grain growth anneal is conducted at a temperature of about 1550° F., in a dry atmosphere containing $HN_x$, for about 40 minutes.

7. A process as recited in claim 1, wherein said first reduced thickness is on the order of 0.155 in., said second reduced thickness is on the order of a 48% reduction from said first reduced thickness; said third reduced thickness is on the order of a 75% reduction from said second reduced thickness, and said fourth reduced thickness is on the order of a 5% reduction from said third reduced thickness.

8. A process as recited in claim 1, wherein the steel has a substantially fully ferritic microstructure.

9. A process as recited in claim 8, wherein the steel has a texture that is predominately an {hk0} and {h00} texture.

10. A process as recited in claim 1, wherein the steel has a permeability of not less than about 2000 G/Oe, and has a core loss of not more than about 1.74 watts/pound, at a thickness on the order of 0.0185 inch.

* * * * *

UNITED STATES PATENT AND TRADEMARK OFFICE
CERTIFICATE OF CORRECTION

PATENT NO. : 6,007,642
DATED : December 28, 1999
INVENTOR(S) : ERIC E. GALLO

It is certified that error appears in the above-identified patent and that said Letters Patent is hereby corrected as shown below:

Claim 1, between lines 16 and 17, insert  --S $\leqq 0.015$--

Signed and Sealed this

First Day of August, 2000

Q. TODD DICKINSON

*Attest:*

*Attesting Officer*        *Director of Patents and Trademarks*

UNITED STATES PATENT AND TRADEMARK OFFICE
CERTIFICATE OF CORRECTION

PATENT NO. : 6,007,642
DATED : December 28, 1999
INVENTOR(S) : Eric E. Gallo

It is certified that error appears in the above-identified patent and that said Letters Patent is hereby corrected as shown below:

Claim 1, between lines 16 and 17, insert --S $\leqq 0.015$--

Signed and Sealed this

Twenty-fourth Day of October, 2000

Attest:

Q. TODD DICKINSON

*Attesting Officer*　　　　*Director of Patents and Trademarks*